United States Patent
Zagatta

(10) Patent No.: US 8,504,996 B2
(45) Date of Patent: Aug. 6, 2013

(54) METHOD AND COMPUTER PROGRAMMING PRODUCT FOR DETECTING MEMORY LEAKS

(75) Inventor: Gunther Zagatta, Altenbeken (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 1751 days.

(21) Appl. No.: 11/765,911

(22) Filed: Jun. 20, 2007

(65) Prior Publication Data

US 2008/0072007 A1    Mar. 20, 2008

(30) Foreign Application Priority Data

Jun. 22, 2006 (DE) .......................... 10 2006 029 138

(51) Int. Cl.
*G06F 9/45* (2006.01)

(52) U.S. Cl.
USPC ........... 717/131; 717/126; 717/127; 717/129; 717/130; 711/154; 711/170

(58) Field of Classification Search
None
See application file for complete search history.

(56) References Cited

U.S. PATENT DOCUMENTS

| | | | | |
|---|---|---|---|---|
| 5,689,707 A * | 11/1997 | Donnelly | ............................. | 1/1 |
| 5,953,530 A * | 9/1999 | Rishi et al. | .................... | 717/127 |
| 6,077,312 A | 6/2000 | Bates et al. | | |
| 6,370,684 B1 * | 4/2002 | De Pauw et al. | ............. | 717/124 |
| 6,523,141 B1 * | 2/2003 | Cantrill | ........................... | 714/48 |
| 6,782,462 B2 * | 8/2004 | Marion et al. | ................. | 711/170 |
| 7,111,307 B1 * | 9/2006 | Wang | ............................. | 719/321 |
| 7,293,142 B1 * | 11/2007 | Xu et al. | ........................ | 711/124 |
| 7,434,206 B2 * | 10/2008 | Seidman et al. | .............. | 717/124 |
| 7,500,079 B2 * | 3/2009 | Becker | ........................ | 711/170 |
| 7,539,833 B2 * | 5/2009 | Krauss et al. | ................. | 711/170 |
| 7,908,591 B1 * | 3/2011 | Nell et al. | ..................... | 717/130 |
| 2003/0163661 A1 * | 8/2003 | Marion et al. | ................. | 711/170 |
| 2004/0078540 A1 * | 4/2004 | Cirne et al. | .................... | 711/170 |

(Continued)

FOREIGN PATENT DOCUMENTS

| | | |
|---|---|---|
| EP | 0729097 A1 | 8/1996 |
| EP | 0778525 A1 | 6/1997 |
| GB | 2357866 A | 7/2001 |
| WO | WO 93/03435 | 2/1993 |

OTHER PUBLICATIONS

Title: Dynamic Memory Allocation Deallocation Behavior in JAVA Programs, author: Fong et al, dated: 2002, source: IEEE.*

(Continued)

*Primary Examiner* — Chameli Das
(74) *Attorney, Agent, or Firm* — Orrick Herrington & Sutcliffe, LLP

(57) ABSTRACT

The invention relates to a method for detecting memory leaks produced by a program running on a computer, wherein during a program run, for each allocation of a memory region at least one information item concerning the performed allocation is entered in an allocation list and a check is made as to whether the allocation list contains a stored reference pattern of information that is typical for one or more memory leaks, and after a stored reference pattern is found the program run is paused, or a memory leak thus detected is associated with the region of the running program whose processing resulted in the most recent entry in the allocation list. The invention further relates to a computer programming product which carries out the method when the computer program is executed on a computer.

7 Claims, 7 Drawing Sheets

U.S. PATENT DOCUMENTS

| | | | |
|---|---|---|---|
| 2004/0111444 A1* | 6/2004 | Garthwaite | 707/205 |
| 2005/0076184 A1* | 4/2005 | Schumacher | 711/170 |
| 2005/0144412 A1* | 6/2005 | Swafford et al. | 711/170 |
| 2005/0235127 A1* | 10/2005 | Muthiah et al. | 711/170 |
| 2006/0123216 A1* | 6/2006 | Krauss et al. | 711/171 |
| 2008/0168444 A1* | 7/2008 | Dickenson | 718/100 |
| 2010/0153922 A1* | 6/2010 | Obata et al. | 717/124 |

OTHER PUBLICATIONS

German Search Report, for German Application No. 10 2006 029 138.7, Feb. 13, 2007.

Raman, Krishna, et al., "Patterns and Tools for . . . ", Dept. of Elec. Eng. & Comp. Sci., Univ. of CA, Irvine, CA, Proceedings of 11th IEEE Int'l Conf., pp. 1-7, 2005.

German Examiner's Report dated Jul. 5, 2011 (with English machine translation).

Valgrind Developers: Valgrind Documentation. Release 3.2.07 Jun. 2006. Veröffentlicht am:Jul. 6, 2006. URL: http://valgrind.org/downloads/archive/valgrind-3.2.0.tar.bz2 [recherchiert am Jun. 30, 2011].

Maebe J. et al., "Precise Detection of Memory Leaks". In Proceedings of the Second International Workshop on Dynamic Analysis (WODA 2004), 2004, 25-31.

* cited by examiner

...
Data: <| OxX  Y   > 7C D9 4F 78 58 00 00 00 59 00 00 00 01 00 00 00
f:\rtm\vctools\vc7libs\ship\atlmfc\src\mfc\strcore.cpp(141) : {31106} normal block at 0x0218CA30, 164 bytes long.
Data: <| OxH  I   > 7C D9 4F 78 48 00 00 00 49 00 00 00 01 00 00 00
f:\rtm\vctools\vc7libs\ship\atlmfc\src\mfc\strcore.cpp (141) : {31104} normal block at 0x02188938, 30 bytes long.
Data: <| Ox       > 7C D9 4F 78 06 00 00 00 06 00 00 00 01 00 00 00
f: \rtm\vctools\vc7libs\ship\atlmfc\src\mfc\strcore. cpp (141) : {31103} normal block at 0x0218C760, 50 bytes long.
Data: <| Ox       > 7C D9 4F 78 10 00 00 00 10 00 00 00 01 00 00 00
{31102} normal block at 0x0218C248, 20 bytes long.
Data: <   @       > 04 00 00 00 40 CA 18 02 20 CB 18 02 20 CC 18 02
.\XDeskFrame.cpp (1893) : {31101} normal block at 0x0218C050, 32 bytes long.
Data: < a/x  L  p > 80 61 2F 78 04 00 00 00 4C C2 18 02 70 C7 18 02
f:\rtm\vctools\vc7libs\ship\atlmfc\src\mfc\strcore.cpp (141) : {21091} normal block at 0x021463F0, 24 bytes long.
Data: < | Ox      > 7C D9 4F 78 03 00 00 00 03 00 00 00 01 00 00 00
f:\rtm\vctools\vc7libs\ship\atlmfc\src\mfc\strcore.cpp (173) : {21075} normal block at 0x0158AA50, 82 bytes long.
Data: < | Ox      > 7C D9 4F 78 12 00 00 00 20 00 00 00 01 00 00 00
{21041} client block at 0x02146318, subtype c0, 64 bytes long.
{21029} normal block at 0x0210FB58, 40 bytes long.
Data: < dK   r    > 80 D9 64 4B 01 00 00 00 08 72 1E 00 FF FF FF FF

{17732} client block at 0x02110EC0, subtype c0, 64 bytes long.
{17537} client block at 0x0210FCB8, subtype c0, 64 bytes long.
{17039} client block at 0x0210C4F0, subtype c0, 64 bytes long.
{16883} client block at 0x0210B9E0, subtype c0, 64 bytes long.
{16565} client block at 0x020EEA28, subtype c0, 64 bytes long.
{15592} client block at 0x020F96A8, subtype c0, 64 bytes long.
{15557} client block at 0x020F8840, subtype c0, 64 bytes long.
{15524} client block at 0x020F7FA8, subtype c0, 64 bytes long.
{15489} client block at 0x020F7838, subtype c0, 64 bytes long.
{15458} client block at 0x020F7590, subtype c0, 64 bytes long.
{15305} client block at 0x020F6B90, subtype c0, 64 bytes long.
{15151} client block at 0x020F3590, subtype c0, 64 bytes long.
{15120} client block at 0x020F5878, subtype c0, 64 bytes long.
{14635} client block at 0x020F0518, subtype c0, 64 bytes long.
{14308} client block at 0x020EF918, subtype c0, 64 bytes long.
{14156} client block at 0x020EEFC0, subtype c0, 64 bytes long.
. \VariablesManagementRC.cpp (36) : {13560} client block at 0x020ECF00, subtype c0, 64 bytes long.
b: \expsw\modules\components\variabledatabaseeditor\src\resourcedll\variabledatabaseeditorrc.cpp (36) : {13280} client block at 0x020E8E90, subtype c0, 64 bytes long.
b: \expsw\modules\components\usermanager\src\resourcedll\usermanagerrc.cpp (36) : {12902} client block at 0x020E35C0, subtype c0, 64 bytes long.
b :\expsw\modules\components\projectexperiment\src\resourcedll\projectexperimentrc.cpp (36): {12700} client block at 0x020E2600, subtype c0, 64 bytes long.
...

|     |     | 502 |          |
| --- | --- | --- | -------- |
|     | 1   | 1   | {0,48}   |
|     | 3   | 3   | {56,54}  |
| 503 | 6   | 6   | {1,176}  |
|     | 7   | 7   | {1,196}  |
|     | 8   | 8   | {1,164}  |
|     | 9   | 9   | {2,30}   |
|     | 10  | 10  | {1,50}   |
|     | 11  | 11  | {1,20}   |
|     | 12  | 12  | {1,32}   |
| 505 | 14  | 14  | {16,82}  |
|     | 15  | 15  | {34,64}  |
|     | 16  | 16  | {12,40}  |
|     | 23  | 23  | {35,64}  |
|     | 24  | 24  | {33,64}  |
|     | 25  | 25  | {35,64}  |
|     | 26  | 26  | {31,64}  |
| 504 | 29  | 29  | {31,64}  |
|     | 36  | 36  | {202,64} |
|     | 37  | 37  | {22,64}  |

Pattern list:

Allocation list:

Contents after the nth allocation:

n+1th allocation: 24 bytes are requested and entered; the remainder is shifted. The 1 is no longer necessary and is lost.

METHOD AND COMPUTER PROGRAMMING PRODUCT FOR DETECTING MEMORY LEAKS

RELATED APPLICATION(S)

Applicants hereby claim priority under 35 USC §119 to German Application No. 10 2006 029 138.7 filed Jun. 22, 2006 incorporated herein by reference.

FIELD OF THE INVENTION

The present invention relates to a method and a computer programming product for detecting memory leaks produced by a program running on a computer, where a memory leak list is generated while the program is running.

BACKGROUND

A memory leak refers to an allocated memory region, a memory block, for example, which, after being used by a program running on a computer, is not released. For the entire run time of the program, this memory region, in particular memory block, can then no longer be used for the program or for other purposes (other programs or operating system requirements), so that the free memory still available may run low, particularly when such memory leaks occur numerous times.

In addition, as the result of fragmentation of the main memory due to unreleased memory regions it may no longer be possible for the system to effectively access large contiguous memory blocks (larger than 100 MB, for example). The system may be burdened and may become progressively more unstable.

For programmers, such memory management errors occur relatively frequently in computer-based languages (such as C/C++). Due to the ever-increasing complexity, the programmer forgets to release the reserved memory region/memory block at the correct time. A detailed discussion of the fundamentals of memory leaks is disclosed in US 2005/0235127 A1 and US 2004/0078540 A1, for example.

By use of automated software it is practically impossible to determine the point in time after which a memory region/memory block is no longer being used by a program. There is currently no tool which allows the developer to identify 100% of such cases. Although the developer can obtain a list of all memory leaks that have occurred after the program has ended, as described below, in order to eliminate the underlying programming error the developer would require an association with the specific situation during the program execution in which the memory region/memory block in question is allocated.

Commercially available tools, such as the FindLeak program by cjt Systemsoftware AG and the methods described in US 2005/0235127 A1 and US 2004/0078540 A1, give the developer a heuristic method-based indication of potential memory leaks. A disadvantage is that the developer must constantly verify the individual memory leaks; i.e., it is not clear that all unreleased memory region/memory blocks are memory leaks until the program has ended. No option is provided for associating the confirmed memory leaks at the end of the program with the heuristic information, and thus there is no option for tracking more detailed information about the memory leak when the program is running.

To reduce the described problems, with CRT (C run-time) library and MFC (Microsoft Foundation Classes) Microsoft Visual Studio offers the developer the option of labeling potential memory leaks after a program has run. To this end, MFC logs all memory allocations and deallocations, and after the program has run, indicates all remaining entries as text output, for example, in a debug output window in the form of a memory leak list or memory leak dump. Thus, by use of this option offered by Microsoft or other providers the programmer may generate a memory leak list in which all memory regions/memory blocks that are allocated but no longer released are listed, optionally together with other information.

An MFC application generated in Visual Studio using wizard support automatically logs and reports the memory requirements. In self-generated configurations, the developer may start the log process using the _CrtSetDbgFlag method.

The information which MFC is able to provide at this point in time is rudimentary. Class names or call stacks are no longer available after the program has ended, and logging of this information during the run time is very memory-intensive. The file name and the line number in which the object is allocated is sometimes given, but frequently this information is not provided, since the name of the file from which the request comes is not known unless the name has been specifically delivered to the logging memory management routines, which often does not occur. Preprocessor macros are used for this purpose, but such macros are prone to malfunction, if they can be used at all. Thus, as a rule only about 50% of memory leaks are provided with file names.

Although the file name and line number give a precise indication of the object that has been allocated, in most cases this is not useful to the developer, since the allocation code is generally satisfactory and the programmer must determine why the object is being allocated and not released, and in particular, at what location in a program this error has occurred.

The memory address contains little useful information since it changes with each program run, and after the program has run the memory address provides no information concerning the context of the allocation.

Under special circumstances the memory block size gives the developer information about the object, but generally is not predictive and therefore is not used in standard methods. In addition, the experience of the developer is a factor that determines the usefulness of this information.

The core concept of a method proposed by Microsoft for eliminating memory leaks is the introduction of a consecutive allocation number which indicates the order number of the memory allocation during the program run which has resulted in the memory leak.

Together with the referenced logging option, there is, for example, the function (_CrtSetBreakAlloc) by means of which the developer may interrupt execution of the program when an allocation number delivered to the function has been reached. If the developer provides the number reported at the last memory leak dump to said function, the program pauses at the next run exactly at the location where the "lost" object is allocated. This association of the identified memory leak with the specific run time situation during the allocation gives the developer crucial information for eliminating the underlying programming error.

For large GUI-intensive applications, however, in actual practice allocation numbers are in the 6 to 8 digit range for most memory leaks. Due to the intense networking of these applications with the autonomous GUI and task management of the operating system, the linkage between the object allocation and the allocation number is no longer deterministic. Even small differences in run time between two program runs intended to be identical result in unpredictable shifts in the allocation numbers for the same object in the various runs.

This may be due to the fact that, for example, in addition to the allocations of memory regions by the program to be investigated, the operating system or other programs running in parallel also perform allocations of memory regions. This results in intermingling of the memory allocations and possibly of the releases of the program that is to be investigated with the allocations and possibly releases of other programs or the operating system. This makes it virtually impossible for a programmer to draw conclusions concerning the reason for an allocation, and in particular, the lack of a deallocation.

The method proposed by Microsoft reaches its natural limit at this point. Because of the difficulty in determining the circumstances of allocation and release, the allocation number loses its informative value, and it is therefore impossible to search for the underlying programming error for the memory leak.

SUMMARY

One object of the present invention is to provide a method and a computer programming product by means of which memory leaks resulting from programming error in a running program may be detected with certainty, or at least with greater probability, and which enables programming regions responsible for creating memory leaks to be assigned to corresponding memory leaks.

A further object is to eliminate the described disadvantages of the prior art, and, despite the indeterminability, in particular of the allocation numbers, to identify the causes of the memory leaks, i.e., to obtain information concerning the program location in a running program which is causing the memory leak.

The example object is achieved by a method and/or a computer programming product for carrying out the method using a computer, in which, during a program run, for each allocation of a memory region, at least one information item concerning the performed allocation is entered in an allocation list. A check is made as to whether the allocation list contains a stored reference pattern of information that is typical for one or more memory leaks, and after a stored pattern is found the program run is paused, or a memory leak thus detected is associated with the region of the running program whose processing resulted in the most recent entry in the allocation list.

One concept of the invention is that at least one reference pattern is present which contains a sequence of determined information that is known for a memory leak resulting from a running program, whose site of origin in the program is to be determined in order to eliminate the errors which led to creation of the memory leak.

Thus, according to one aspect of the invention, during the run time of the program a search is made as to whether an information sequence has been generated in the allocation list, supplemented during the run time with at least one information item with each new allocation of memory, which corresponds to the stored pattern. If such a stored reference pattern is found in the allocation list, this indicates that the sought memory leak has occurred in the program, and in particular the time of occurrence is specified by the time that the most recent allocation information was written in the allocation list. Thus, for an accurate temporal resolution of the occurrence and localization in program code it is advantageous when the search for a stored reference pattern is started anew each time after information is written in the allocation list.

Since this search is conducted during the run time of the program, it is possible for the program to immediately pause when the reference pattern being searched for has been found. The programmer thus receives information about the location of the origin of a memory leak in the program code and can eliminate the error.

As an alternative, it is possible that the program is not paused, but instead a memory leak thus detected is associated with the region of the running program whose processing resulted in the most recent entry in the allocation list. For example, an association table may be generated in this manner, and at a later time the programmer may identify the parts of the program responsible for the error by use of the association information.

Compared to the prior art, this aspect of the invention thus offers the advantage that, in addition to a determination that a memory leak has occurred, it is also possible to localize in the program the program code responsible for the error.

It is thus an aspect of the invention that, in addition to the program to be investigated, a program routine is also processed by a computer which logs the allocation of memory and ensures that for the allocation, typical and/or meaningful information is always entered in the allocation list when a new allocation takes place.

Such a routine may be provided, for example, in a software library which is linked to the program, for example, so that the routine may be called up with each allocation.

Typical, important, or meaningful information concerning a performed allocation may, for example, be built from the length of an allocated memory region. Thus, the allocation list may be formed by a list in which numbers corresponding to the length of the respective memory region most recently allocated are continuously entered in succession. The location of the numbers in the list provides information which is also used to automatically identify the relative distances of the respectively allocated memory blocks from one another.

The at least one reference pattern stored for use in a comparison may be created in any manner. For example, it may constitute a library containing typical patterns which, for example, result from typical programming errors.

In certain example embodiments of the method according to certain aspects of the invention, preceding program runs may be performed before a program run for localization of a program code creating a memory leak. This provides an overview of the type of memory leaks the program to be investigated creates as a whole, and the types of patterns that are typical for the memory leak, so that later the localization may be performed during the run time of a separate program run. Programs known in the prior art for generating memory leak lists may be used for this purpose.

In one embodiment, for creating at least one reference pattern, in particular for a preceding program run, a memory leak list may be generated which after the program run contains information concerning all memory leaks originating during the program run, whereby the memory leak list or a file created therefrom is searched for information that is typical for memory leaks, and this information or data derived therefrom is stored as at least one pattern.

Absolute allocation numbers and memory region lengths as described above, for example, may be recorded in such memory leak lists. It is thus possible to generate reference patterns from such a memory leak list, for example by searching a memory leak list for the occurrence of length indications and/or allocation numbers. One or more consecutive length indications may form a reference pattern which is stored for subsequent localization, for example by storing the sequence or subsequence of the length indication listed in the memory leak list.

It is problematic that, possibly due to influences from the operating system or other programs, an absolute sequence of length indications in such a memory leak list is not always the same, so that a stored pattern may not necessarily be found in a subsequent program run.

Thus, in another example embodiment for creating at least one reference pattern for at least two, for example, preceding, program runs one respective memory leak list is generated which after the particular program run includes information concerning all memory leaks originating in the particular program run, whereby the at least two memory leak lists or files produced therefrom are searched, at least in places, for matching information. The information or data derived therefrom which matches at least in places is stored as at least one pattern, and in particular each contiguous region of matching information forms a pattern.

Thus, a program to be investigated for programming errors is run at least twice. In each program run, a memory leak list is generated, for example, by use of a prescribed method known and offered by Microsoft, or by use of another method which provides such a memory leak list.

According to this aspect of the invention, the at least two memory leak lists or files produced therefrom for the respective program runs are then searched for matching patterns.

The occurrence of a common pattern in both memory leak lists/files may indicate that a memory leak has occurred, for example, when expanded determinability is established via the pattern and it is thus made possible to find the underlying programming error.

One concept of this embodiment is that searching for matching patterns in the at least two memory leak lists or data generated therefrom increases the likelihood that, by means of a detected pattern which indicates a memory leak, such a memory leak is identified which is attributed to the run of the program being investigated, and not to other circumstances.

As previously mentioned, in the evaluation of an individual memory leak list it is problematic that, in addition to memory leaks created by the program to be investigated, memory leaks are also listed which may result from influences by programs or operating system routines running in parallel which are more or less coincidental, i.e., are not deterministically arranged in the sequence of the detected memory leak and are not of interest to the programmer.

Since it is unlikely that for at least one additional program run, a memory leak, for example, at the same location and having the same length, in turn is "coincidentally" created by another program/operating system, and the memory leaks which are definitively attributed to the program being investigated, even for different/multiple program runs, produce at least partly identical information in a memory leak list, such as the length and location of the leak, or the distance from a previously created leak, when the same information appears in the at least two memory leak lists or data generated therefrom, a conclusion can be drawn that a memory leak identified in this manner is attributed to a programming error in the program being investigated, and not to another program running in parallel, or to the operating system.

In order to find the matching information in the respective memory leak lists, a method may be used for a pattern search of the respective lists or of files which at least partially contain information concerning the respective memory leak lists, or possibly also newly generated information.

Thus, known methods may be used for the pattern search which do not constitute the actual subject matter of the invention. For example, methods known to one skilled in the art, such as the longest common subsequence (LCS) algorithm or the diff algorithm, may be used which are able to identify patterns based, for example, on recognition of the longest contiguous character sequence. The software program Beyond Compare, known to one skilled in the art, may also be used.

Such methods for pattern recognition may be implemented in a separate program which reads the information from the memory leak lists or the files produced therefrom, or may already be implemented in a program which completely carries out the method according to the invention.

Thus, such a complete program may be started on a computer by the developer, for example, whereby as a delivery parameter, for example, the name of the program to be investigated may be delivered, or the program code may be delivered directly. The program for carrying out the method according to the invention may then perform the at least two-time execution and generate the lists or files from the lists, and, for example, perform the pattern recognition, immediately, for example.

To simplify the search for matching patterns, in one embodiment of the invention the length of the allocated and no longer released memory blocks and/or the distance of a memory leak from a previous memory leak may be investigated. To this end, this information may also be extracted from the memory leak lists, and in particular written in separate files before a pattern search.

An essential concept is that memory leaks which are created by a program to be investigated are presumed to always have the same length, and may therefore be associated with the program. Since this may also occur for operating system routines that are periodically called up, according to one example embodiment, the location of a memory leak may also be evaluated, or, as previously mentioned, since this location may be different even for two identical program runs, the distance between two memory leaks may be evaluated, since these remain constant for two identical program runs.

It may therefore be advantageous to base the pattern search primarily on the distance and length of memory leaks. Entries may be disregarded in the pattern search in which a distance exceeds a specified limit value, for example, when the distance is greater than 100.

To simplify this search, in one example embodiment of the invention certain information may first be written from a particular memory leak list to a respective separate file, and information may optionally be generated anew from the existing information. The information which is extracted from the particular memory leak list may constitute, for example, at least the distances and lengths of memory leaks, whereby, for example, the distances may be generated or determined from the difference in the allocation numbers which are written in the lists during generation of the memory leak lists by use of the known methods.

The search for such patterns referenced above is thus simplified when the separate files that are investigated primarily contain information which may possibly be provided first, such as the difference in the allocation numbers, so that in turn the pattern recognition methods of the aforementioned type may then be used in a simplified manner, which, for example, recognize the largest text regions in agreement, and therefore do not also have to be designed for searching for distances and lengths of memory leaks or for other specified patterns.

Standard methods may thus be used. However, generation of such intermediately placed files is not absolutely necessary for the method; the matching patterns may also be searched directly in the memory leak lists, optionally using programs adapted for this purpose.

According to one embodiment of the method, recurring number pairs, for example, composed of the leak distance and leak length, and possibly containing information about where the number pairs have been found in a file or an original memory leak list, are used as patterns. These location indications may be provided by line numbers.

When matching information is found while carrying out the method according to one aspect of the invention, it is advantageous to store such matching information as reference patterns for later access in the localization.

Regardless of their location of origin, reference patterns may be stored in a memory region of the computer on which the program to be investigated or a program for carrying out the method runs. For example, the storage may occur in the registry of the computer. It is advantageous when only patterns containing more than one memory leak are stored for later comparison, since with an increasing number of successive memory leaks there is a higher likelihood that these memory leaks are created by the program to be investigated.

By use of the reference patterns obtained in this manner or in some other way, the programmer is provided with better options for identifying memory leaks, for which it is possible to make an assignment to the programming regions that are responsible for the memory leak.

By use of the reference patterns, optionally obtained beforehand, one program run may then be carried out for at least one reference pattern, or, for example, for each individual reference pattern, and at the same time a previously described allocation list is generated in which after each new entry a search is made for the particular reference pattern.

It may happen that a pattern stored in the allocation list is found in a program run, but in fact no memory leak has occurred. Thus, after finding a pattern it is possible that a conclusion can be made only as to the existence of an actual memory leak, when in fact a memory leak has also been entered at the same time in a memory leak list maintained in parallel.

If a match is found, for example, for a simultaneous entry of a memory leak in the memory leak list, the run of the program being investigated may be paused, or at a minimum the association described above may be performed.

It is thus possible to determine not only that a memory leak is present, but also by pausing the program execution at the instant that a memory leak is found, it is possible to determine the run time point or the location in the run program at which the memory leak originated. Thus, according to the invention a programmer has a very simple option, in addition to determining a memory leak, to also localize the memory leak and eliminate the error in the programming.

By use of the method according to the invention, a found memory leak may thus be associated with a region of a run program by pausing the program execution or in some other manner, for example by tracing or tracking.

In addition to the possibility of pausing the program when a memory leak is determined for a found pattern, in an alternative or cumulative manner it is possible to store an association of the found memory leak with a program region where the error originated. Thus, in this embodiment the program may still be run, even when the programmer has the option to find the errors in the program by use of such an association list.

BRIEF DESCRIPTION OF THE DRAWINGS

One exemplary embodiment is described in greater detail below with reference to the figures, which show the following:

FIG. 2 shows an excerpt from a memory leak list from Microsoft, for example;

FIG. 4 shows a comparison of two memory leaks converted to standard files;

FIG. 5: shows the recognized memory leak patterns following the differentiation unit.

DETAILED DESCRIPTION

Figure 1:
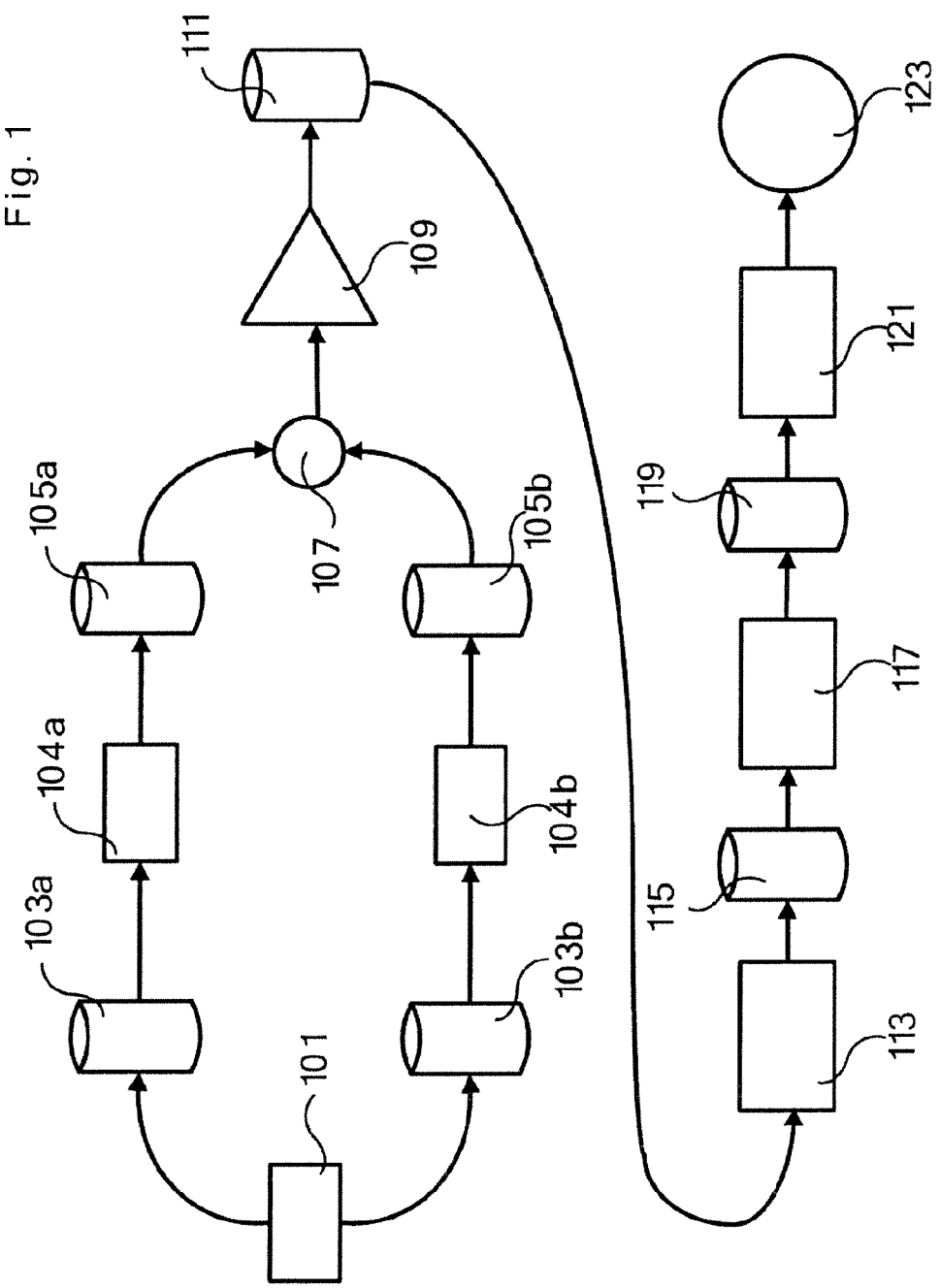
FIG. 1 shows an illustration of the method as a flow diagram.

The starting point for the method according to one aspect of the invention, illustrated here by way of example according to FIG. 1, is two program runs 101 in the programmed software of the developer which are to be investigated for whether, as the result of programming error, the program runs reserve memory which is not released after use. The two program runs are schematically illustrated in a single box 101.

In each of the two program runs a memory leak list 103a or 103b is generated by the Microsoft Visual Studio development environment or by another program which may run on the computer in parallel with the program run, and the memory leak list logs all memory leaks created during the program run without providing information from which the location of origin in the program may be determined.

Figure 3:
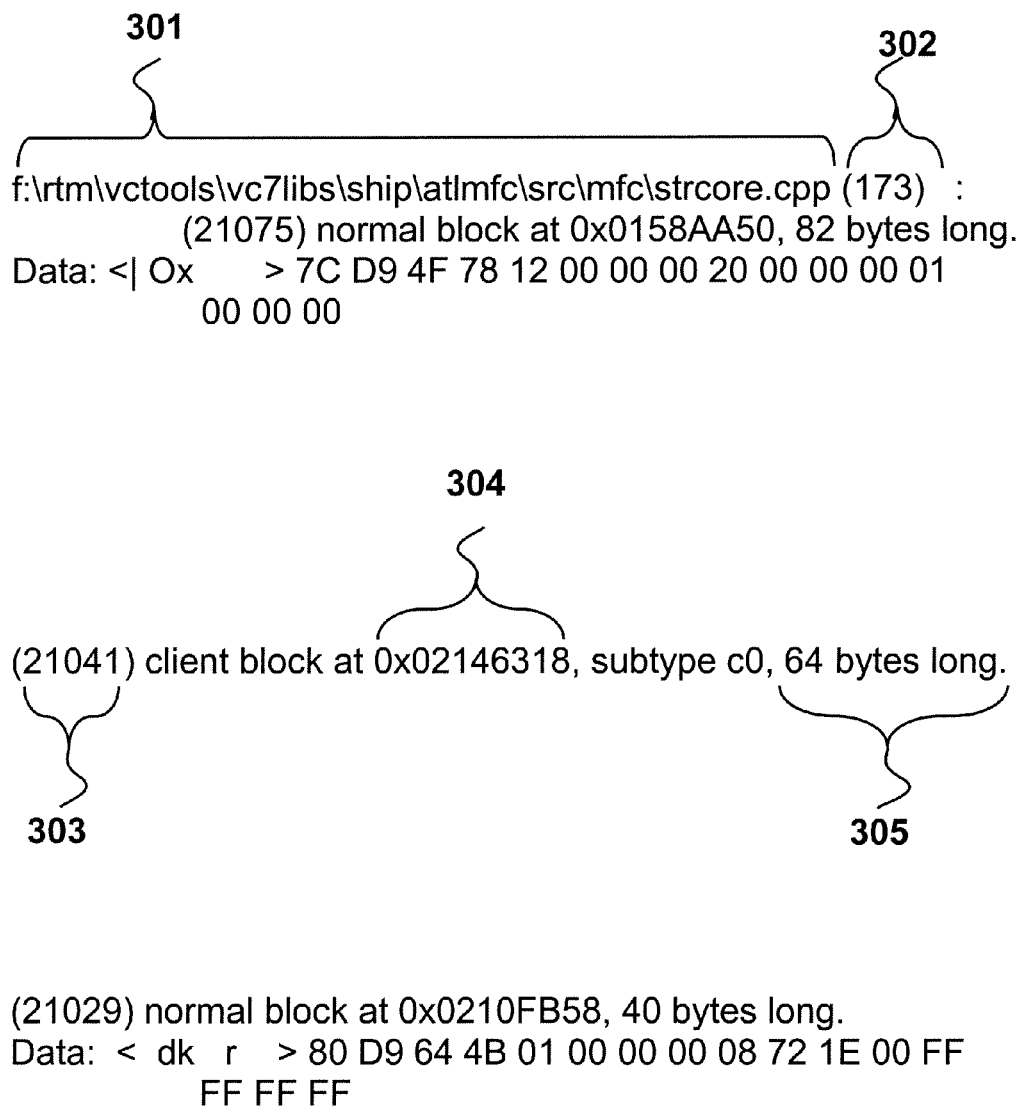
FIG. 3 shows information from a line in the memory leak list.

FIG. 2 shows an example of an excerpt from such a list 103a or 103b. Such a memory leak list may contain a large amount of information, such as the information 201, which in the extract shown in FIG. 3 provides data concerning the file name 301, line number 302, allocation number 303, memory address 304, and memory block size 305.

At this point it should be noted that other output information may be used, whereby for the method according to the invention a relative indication of the position or the distance from a preceding memory leak is used as the location of the memory leak by way of example, and the memory leak in this case may be read from the allocation number by taking the difference between two consecutive allocation numbers. Furthermore, according to the invention the size of the memory leak is used, which is provided directly from the list 103a or 103b by a length indication 305 and which may be read, for example, as plain text.

From a particular memory leak list 103a/b, by use of a program 104a or 104b, for example, which may run on the same computer and which in one example runs as a readout script 104a/b (provided in the appendix), the contents of each memory leak list 103a or 103b may be converted to a standard format, for example, or may be extracted into a respective new file 105a/105b in which the characteristic information, which includes the position with respect to the preceding memory leak and the storage size of the memory leak, is stored.

Figure 4:
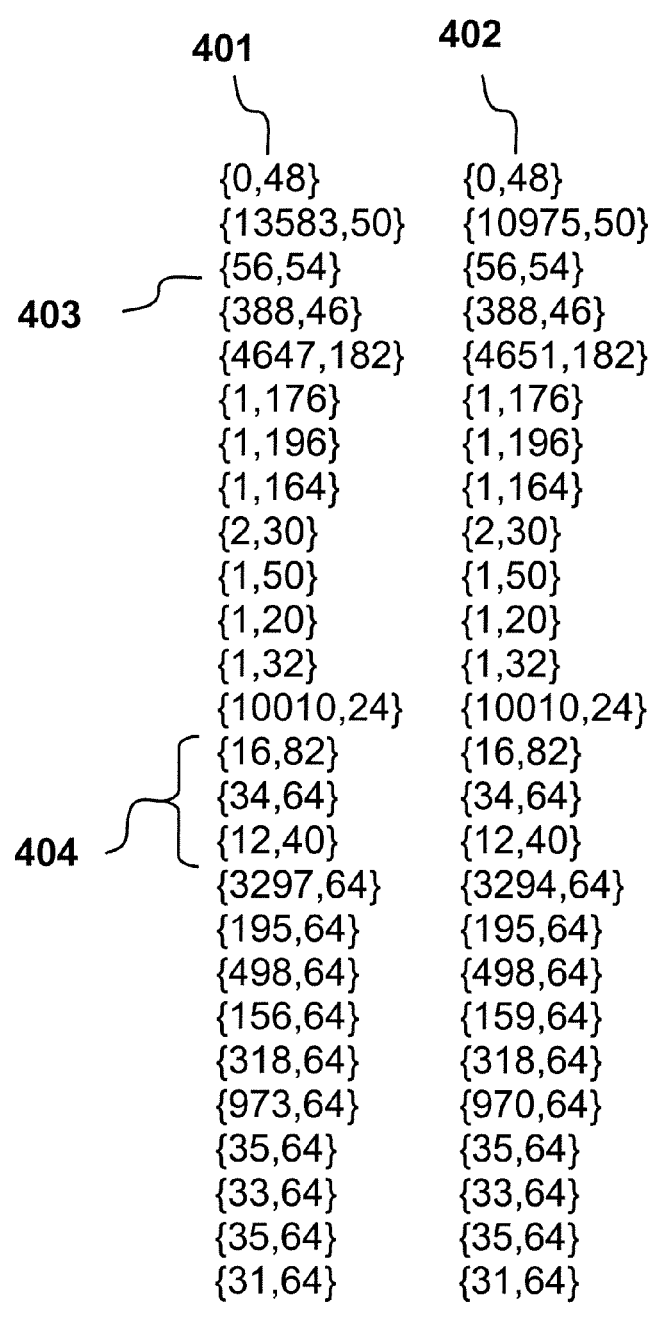

The contents of possible files 105a/b are illustrated in FIG. 4. As an example, in each file the information is illustrated as a tuple in braces. The first entry in the tuple specifies the position corresponding to the distance from the preceding memory leak, and the second entry specifies the size of the memory leak, each line containing a new memory leak entry. The two columns 401 and 402 are excerpts from the respective files 105a and 105b which originate from the two identical program runs 101.

As described, two identical program runs 101 do not result in identical memory leak lists, in particular for large, graphical user interface (GUI)-intensive programs. This is due in part to the fact that during program run 101 the operating system automatically executes system calls and interrupts at times that are not predictable in advance. To eliminate these influences and to determine the effective memory leaks, at least two identical program runs 101 are carried out for which the respective memory leak list 103 a/b is determined (a indicates the first run, and b, the second run).

From the memory leak lists 103 a/b in each case the file 105 a/b is determined via the readout script 104 a/b. The information concerning memory leaks is contained in the respective standard files 105 a/b, and although the information has a recurring information pattern as a result of its origin, it does not always occur at the same positions in the file.

To produce reference patterns for subsequent localization during a program run, the files 105 a/b are sent to a differential unit 107. The differential unit 107 is implemented, for example, by software which may run on the same computer and which contains, for example, the programmed conversion of the longest common subsequence (LCS) algorithm or the diff algorithm, which are able to identify patterns based, for example, on recognition of the longest contiguous character sequence.

FIG. 5 shows an example excerpt of the output from a differential unit 107 which has converted the Beyond Compare algorithm. Columns 501 and 502 identify the line numbers of files 105a and 105b for which matching tuples have been found. The horizontal dashed lines 503 separate corresponding matching sections which thus identify a memory leak pattern which may be used as a reference pattern. In addition, the relative positions and the sizes of the memory leaks are indicated by the tuples, analogously to FIG. 4.

An examination of FIG. 4 reveals that the tuple values of {0, 48} match in line 1 of the entry in both files 105a and b. This information is recognized as a pattern, and as shown in FIG. 5 is stored as 1, 1, {0, 48}. There is no agreement in the second line of FIG. 4. The next agreement occurs in lines 3 and 4 of FIG. 4, with the tuple values of {56, 54} and {388, 46}, respectively. By means of this comparative search the list or file according to FIG. 5 is successively generated, only one excerpt being shown in FIG. 5 as an example.

An additional recognized pattern is indicated by reference numeral 505, for example. This pattern comprises three entries as a further possible contiguous agreement between files 105a and 105b. This is followed by a pattern containing four entries, followed by a pattern containing only one entry.

For effective further use, the results from the differential unit 107 may be adjusted for individual entries, such as entry 504, which corresponds to a memory leak pattern containing one entry, and may be adjusted for entries that are a great distance from the preceding entry, such as in the fourth and thirteenth lines in FIG. 4, although in this case there is agreement, for which in particular a separate unit 109 may be provided.

In another example embodiment, the contributions of tuples having distances >100 are disregarded for the pattern, since these contributions presumably are not a factor in the pattern for the same reason as for the other memory leaks. Accordingly, entries with such excessively large distances are not listed in FIG. 5.

The remaining memory leak patterns are successively entered, for example in the registry file 111, as subsequent reference patterns for individual program runs. An additional program run 113 is then carried out, and the stored reference patterns are searched and evaluated during the run time.

The sequence of the memory requirements occurring in the program run is compared to that stored in the registry and read from that location upon program startup, and is logged, for example, in the allocation list 115. The information in the allocation list may be recorded in a debug output which contains all information that is internally generated during a program run. The entire debug output thus contains information concerning the particular pattern for which a memory leak occurred.

In one example, a logged memory leak may have actually occurred during the eighth pattern recognition. This information in turn may be written 117 in the registry file 119, and upon recurrence (the eighth occurrence of the pattern corresponds to a memory leak) the new program run 121 is paused and a branch is made to the corresponding source text 123 (programming region) which corresponds to the insertion of a break point in the registry.

Description of the Pattern Search

In the search for the locations in the program at which a memory leak originates, a key component is the pausing of the program execution at the moment at which an allocation is performed which fits the specified pattern (whatever its origin).

For this purpose, a service routine is registered, in particular at the elementary run time libraries for the programming environment (in the present embodiment, Microsoft Visual C++ together with its CRT library), during a program run, and the service routine is then called up for each memory allocation, and as an argument receives at least the required memory block size. These required memory block sizes or lengths are consecutively entered in an allocation list.

The reference patterns to be searched for may comprise a sequence of memory allocations, represented by number pairs, the first number representing the distance from the preceding allocation and the second number representing the required memory block size. As previously described, the patterns may be generated by at least two consecutively executed program runs.

Figure 6A:
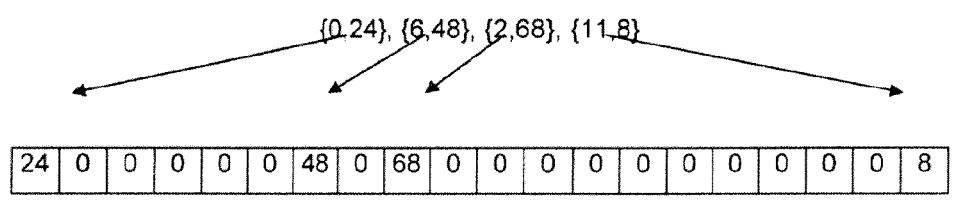
FIGS. 6a-6c: shows the description of the search for stored reference patterns.

These pairs may then be converted to a linear list of individual values, a pattern list, by the fact that the fields are filled with the memory block sizes at the correct distances, and the intermediate fields contain a zero. FIG. 6a shows such a pattern list.

Figure 6B:
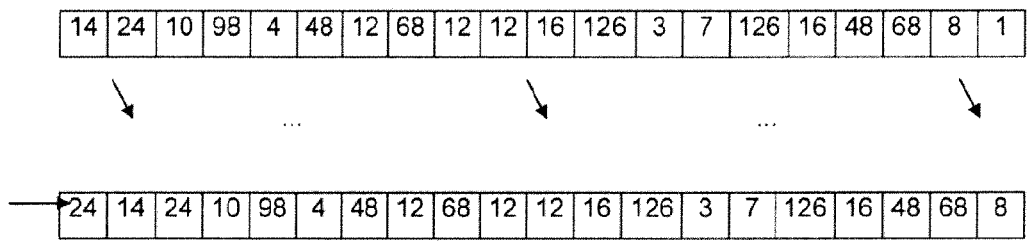

During the program run the occurring memory allocations are logged in an allocation list, in particular whereby for logical reasons it is no longer necessary for these memory allocations to be longer than the pattern lists. At that location the allocations are recorded, in particular by entering the most recent allocation at the front end and moving all preceding allocations one position to the right. Such an allocation list is shown in FIG. 6b.

Figure 6C:
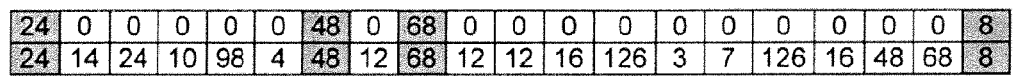

The allocation list is compared to the pattern list after each allocation and entry into the allocation list. Only fields are considered which are not equal to zero in the pattern list. This is shown in FIG. 6c, in which the agreements are shown in shaded form.

When the field contents of the upper pattern list and the lower allocation list match (as illustrated), the pattern has been successfully recognized. In this case the program run may be paused, and the programmer then receives information concerning the location where the error originated.

The embodiments described herein are not to be construed as limiting, and in particular may be taken individually or combined as a whole with the embodiments in the general section of the description.

Appendix: Source text for the readout script

```
Imports System
Imports EnvDTE
Imports EnvDTE80
Imports Microsoft.Win32
Imports System.Diagnostics
Imports System.Collections.Generic
Imports System.Text.RegularExpressions
Imports System.Windows.Forms
Public Module MemoryLeaks
Function MakeHexStr(ByVal Number, ByRef Count)
Dim HexString As String
Dim i As Integer = 0
For i = 0 To 3
Dim ByteVal As Integer = Number Mod 256
Dim HexDigit As String = Hex(ByteVal)
If Len(HexDigit) = 1 Then
HexDigit = "0" + HexDigit
End If
HexString = HexString + HexDigit + ","
Number = (Number – ByteVal) / 256
Next
Count = Count + 1
If Count Mod 4 = 0 Then
HexString = HexString + "\" + vbCrLf + " "
End If
MakeHexStr = HexString
End Function
Function ExtractLeakPatterns( ) As String
Dim Pattern Text As String
Dim MemLeakDump As TextDocument =
DTE.ToolWindows.OutputWindow.ActivePane.TextDocument
MemLeakDump.Selection.StartOfDocument( )
If MemLeakDump.Selection.FindText("Speicherlecks") Then
Dim oRe As Regex
Dim base As Integer = 0
Dim lastLine As Integer = 0
Do While MemLeakDump.Selection.FindText("bytes long")
' if the current line is less than the previous, we passed the end of the file!
If MemLeakDump.Selection.CurrentLine <= lastLine Then
Exit Do
Else
' remember line number of current occurence
lastLine = MemLeakDump.Selection.CurrentLine
End If
' select the whole line
MemLeakDump.Selection.SelectLine( )
Dim line Text As String = MemLeakDump.Selection.Text
oRe = New Regex(".*{([0-9]+)}.* ([0-9]+) bytes.*")
If oRe.IsMatch(lineText) Then
Dim AllocText As String = oRe.Replace(lineText, "$1")
Dim Size Text As String = oRe.Replace(lineText, "$2")
If base = 0 Then
base = CLng(AllocText)
End If
Dim AllocNum As Integer = base – CLng(AllocText)
If AllocNum < 0 Then
Exit Do
End If
Pattern Text = Pattern Text + "{" + Format(AllocNum) + "," +
Format(Val(SizeText)) + "}" + vbCrLf
base = CLng(AllocText)
End If
Loop
End If
ExtractLeakPatterns = Pattern Text
End Function
Sub BuildMemLeakPattern( )
'DESCRIPTION: Creates a Speicherleck match pattern from a selected
portion of debug output text
' Create a new text document.
DTE.ItemOperations.NewFile("General\Text File", "MemleakPattern")
ActiveDocument.Selection.Text = ExtractLeakPatterns( )
End Sub
Sub BuildMemLeakPatternFile( )
Dim PatternText As String = ActiveDocumont.Seloction.Text
Dim RegFileText As String
Dim NumCount As Integer = 0
Dim oRe As Regex
oRe = New Regex("{([0-9]+),([0-9]+)}")
Dim AllMatches As Match = oRe.Match(PatternText)
Do While AllMatches. Length > 0
Dim CurrMatch As String = AllMatches.Value
Dim AllocNum As Integer = oRe.Replace(CurrMatch, "$1")
If NumCount = 0 Then
AllocNum = 0
End If
Dim SizeNum As Integer = oRe.Replace(CurrMatch, "$2")
Dim j As Integer
For j = 2 To AllocNum
RegFileText = RegFileText + MakeHexStr(0, NumCount)
Next
RegFileText = RegFileText + MakeHexStr(SizeNum, NumCount)
AllMatches = AllMatches.NextMatch
Loop
' Create a new text document.
DTE.ItemOperations.NewFile("General\Text File",
"MemLeakPattern.reg")
If NumCount = 0 Then
ActiveDocument.Selection. Text = "No valid Speicherleck patterns
selected"
Elself RegFileText.Length > 3000 Then
ActiveDocument.Selection.Text = "Speicherleck patterns too large"
Else
Dim CountText As String = MakeHexStr(NumCount, NumCount)
' create appropriate .reg file
ActiveDocument.Selection.Text =_
"REGEDIT4" + vbCrLf + vbCrLf_
+ "[HKEY_CURRENT_USER\Software\dSPACE\CalDesk\
MemLeakTracking]" + vbCrLf_
+ """"Enable""""=dword:00000001" + vbCrLf
+ """"Pattern""""=hex:" + CountText + RegFileText + "00" + vbCrLf_
+ """"BreakAtMatchNo""""=dword:00000000" + vbCrLf
+ """"HideLeaksUntilMatch""""=dword:00000000" + vbCrLf_
+ """"HideLeaksAfterMatch""""=dword:00000000" + vbCrLf
End If
End Sub
Sub CheckMemLeakHits( )
Dim mDict As SortedDictionary(Of Integer, Integer) = New
SortedDictionary(OfInteger, Integer)
Dim oRe As Regex = New Regex("matches \( *([0-9]+)\)\[ a-z]+([0-9]+)")
Dim MemLeakDump As TextDocument =
DTE.ToolWindows.OutputWindow.ActivePane.TextDocument
MemLeakDump.Selection.StartOfDocument( )
Do While MemLeakDump.Selection.FindText("*** Condition matches")
MemLeakDump.Selection.SelectLine( )
Dim TheMatch As Match = oRe.Match(MemLeakDump.Selection.Text)
If TheMatch.Length > 0 Then
Dim CurrMatch As String = TheMatch.Value
Dim MatchNum As Integer = oRe.Replace(CurrMatch, "$1")
Dim AllocNum As Integer = oRe.Replace(CurrMatch, "$2")
mDict.Add(AllocNum, MatchNum)
End If
Loop
For Each match As KeyValuePair(Of Integer, Integer) In mDict
MemLeakDump.Selection.StartOfDocument( )
If MemLeakDump.Selection.FindText("{" + Format(match.Key) + "}")
Then
Dim reg As RegistryKey = Registry.CurrentUser
reg = reg.OpenSubKey("Software")
reg = reg.OpenSubKey("dSPACE")
reg = reg.OpenSubKey("CalDesk")
reg = reg.OpenSubKey("MemLeakTracking", True)
reg.SetValue("BreakAtMatchNo", match.Value)
MessageBox.Show("Match number" + Format(match.Value) + "is
indeed a Speicherleck and has been activated for debug-break", "Success")
Exit For
End If
Next
End Sub
End Module
```

The invention claimed is:

1. A method for detecting memory leaks produced by a computer program running on a computer comprising, creating a first memory leak list that records memory allocations that were not de-allocated after a first run of the computer program, wherein the list records the position of each such memory allocation and its size;

creating a second memory leak list that records memory allocations that were not de-allocated after the second run of the computer program, wherein the list records the position of each such memory allocation and its size;

creating a stored reference pattern list by identifying consecutive entries on the first and second memory leak lists that correspond to one another;

during a third run of the computer program using the stored reference pattern list to detect the portions of the computer program that created the memory leak;

wherein the stored reference pattern list records lengths of memory leaks together with their respective relative distances are entered, and in which entries are provided therebetween for memory allocations that did not result in a leak.

2. The method of claim 1 wherein the detection comprises recording a source code function that created the detected memory leak.

3. The method of claim 1 wherein the detection comprises pausing the running of the program at the point where the detected memory leak is allocated.

4. The method according to claim 1, wherein found correspondences are discarded as a contribution to the stored reference pattern list when a memory leak distance exceeds a limit value.

5. The method according to claim 1 wherein the detection is based on memory allocation patterns in agreement with the stored reference list which are found in a memory region of the computer on which the program is running and are further stored in a memory region of the registry, whereby only patterns containing more than one memory leak are stored.

6. The method according to claim 1 wherein a sequence of number pairs is stored as the stored reference pattern list, each pair comprising a number which indicates the relative distance between two memory leaks providing the position, and a number which indicates the length of a memory leak providing the size.

7. The method according to claim 1 wherein the size of the memory leak is recorded as a length of each allocated memory region is entered in the first and second memory leak lists.

* * * * *